(12) United States Patent
Miao et al.

(10) Patent No.: US 9,241,048 B2
(45) Date of Patent: *Jan. 19, 2016

(54) MECHANISM FOR PROCESSING NETWORK EVENT PROTOCOL MESSAGES

(71) Applicant: HUAWEI TECHNOLOGIES CO., LTD., Shenzhen, Guangdong (CN)

(72) Inventors: Fuyou Miao, Beijing (CN); Yuzhi Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,730

(22) Filed: Mar. 9, 2015

(65) Prior Publication Data

US 2015/0181004 A1 Jun. 25, 2015

Related U.S. Application Data

(63) Continuation of application No. 14/304,745, filed on Jun. 13, 2014, which is a continuation of application No. 11/616,949, filed on Dec. 28, 2006, now Pat. No. 8,792,519.

(30) Foreign Application Priority Data

Mar. 9, 2006 (CN) .......................... 2006 1 0057508

(51) Int. Cl.
*H04L 29/06* (2006.01)
*H04L 12/26* (2006.01)
(Continued)

(52) U.S. Cl.
CPC ................ *H04L 69/22* (2013.01); *H04L 43/06* (2013.01); *H04L 49/20* (2013.01); *H04L 67/10* (2013.01)

(58) Field of Classification Search
CPC ................................. H04L 43/06; H04L 69/08
USPC .................................................. 370/464, 474
See application file for complete search history.

(56) References Cited

U.S. PATENT DOCUMENTS

| 5,361,372 A | 11/1994 | Rege et al. |
|---|---|---|
| 6,654,796 B1 | 11/2003 | Slater et al. |
| 6,978,384 B1 | 12/2005 | Milliken |

(Continued)

FOREIGN PATENT DOCUMENTS

CN 1581869 2/2005

OTHER PUBLICATIONS

Notice of Allowance, dated Mar. 10, 2015, in corresponding U.S. Appl. No. 14/304,745.

(Continued)

*Primary Examiner* — Siming Liu
(74) *Attorney, Agent, or Firm* — Staas & Halsey LLP

(57) ABSTRACT

A communication system includes a first apparatus and a second apparatus. The first apparatus is configured to: attach first and second message length information to a first and second SYSLOG message, respectively; form at least a portion of a transport payload by adding a first portion and a second portion thereto, wherein the first portion includes the first SYSLOG message with the attached first message length information, and the second portion includes the second SYSLOG message with the attached second message length information; and send the transport payload. The second apparatus is configured to: parse the first and second SYSLOG messages one by one from the transport payload.

7 Claims, 2 Drawing Sheets

(51) Int. Cl.
*H04L 29/08* (2006.01)
*H04L 12/931* (2013.01)

(56) References Cited

U.S. PATENT DOCUMENTS

| | | | |
|---|---|---|---|
| 7,155,512 | B2 | 12/2006 | Lean et al. |
| 7,434,255 | B2 | 10/2008 | Akimoto |
| 8,792,519 | B2 * | 7/2014 | Miao et al. .................. 370/474 |
| 2003/0105850 | A1 | 6/2003 | Lean et al. |
| 2005/0018670 | A1 | 1/2005 | Shigematsu et al. |
| 2005/0120079 | A1 | 6/2005 | Anderson et al. |
| 2005/0254518 | A1 | 11/2005 | Fujimori |
| 2006/0271826 | A1 | 11/2006 | Desai et al. |

OTHER PUBLICATIONS

Gerhards, R., *SSL Encrypting Syslog with Stunnel*, www.rsyslog.com/Documentation-/rsyslog_stunnel.html, Jul. 22, 2005 (5 pp.).

Office Action, dated Aug. 14, 2014, in corresponding U.S. Appl. No. 14/304,745.

Notice of Allowance, dated Jun. 20, 2014, in corresponding U.S. Appl. No. 11/616,949.

Final Office Action, dated Dec. 5, 2013, in corresponding U.S. Appl. No. 11/616,949.

Office Action, dated May 9, 2013, in corresponding U.S. Appl. No. 11/616,949.

Office Action, dated Dec. 22, 2011, in corresponding U.S. Appl. No. 11/616,949.

Cover page listing prior art of corresponding Chinese Patent No. 100583889C, issued Jan. 20, 2010 (13 pp.).

First Office Action of corresponding Chinese Application No. 200610057508.0, dated Apr. 10, 2009 (10 pp.).

First Office Action of corresponding European Application No. 06127301.7, dated Feb. 16, 2009 (4 pp.).

Final Office Action, dated Apr. 29, 2011, in corresponding U.S. Appl. No. 11/616,949.

Office Action, date Oct. 7, 2010, in corresponding U.S. Appl. No. 11/616,949.

Advisory Action, dated Mar. 16, 2010, in corresponding U.S. Appl. No. 11/616,949.

Final Office Action, dated Nov. 18, 2009, in corresponding U.S. Appl. No. 11/616,949.

Office Action, dated Apr. 17, 2009, in corresponding U.S. Appl. No. 11/616,949.

Postel, *User Datagram Protocol*, retrieved from Internet on Oct. 13, 1998, URL: http://www.pmg.lcs.mit.edu/cgi-bin/rfc/view?number=768.

European Search Report, dated Aug. 27, 2007, in corresponding European Application No. 06127301.7-2416.

Notice of Allowance, dated Dec. 10, 2014, in corresponding U.S. Appl. No. 14/304,745.

Dierks, T. et al., *The TLS Protocol Version 1.1*, Internet-Draft, draft-ietf-tls-rfc2246-bis-13.txt, RTFM, Inc., Jun. 2005 (81 pp.).

Gerhards, R., *SSL Encrypting Syslog with Stunnel*, www.rsyslog.corn/Documentation-/rsyslog_stunnel.html, Jul. 22, 2005 (5 pp.).

Gerhards, R., *The syslog Protocol*, draft-ietf-syslog-protocol-16.txt, syslog Working Group, Internet-Draft, Adiscon GmbH, Jan. 3, 2006 (46 pp.).

Kelsey, J. et al., *Signed syslog Messages*, draft-ietf-syslog-protocol-17.txt, syslog Working Group, Internet-Draft, PGP Corporation and Cisco Systems, Inc., Nov. 22, 2005 (30 pp.).

Lonvick, C., *The BSD syslog Protocol*, Network Working Group, Requst for Comments: 3164, Cisco Systems, Inc., Aug. 2001 (26 pp.).

Miao, F. et al., *Transport Layer Security (TLS) Transport Mapping for Syslong*, Network Working Group, Request for Comments: 5425, Huawei Technologies and Cisco Systems, Inc., Mar. 2009 (13 pp.).

New, D. et al., *Reliable Delivery for syslog*, Network Working Group, Request for Comments: 3195, Dover Beach Consulting, Inc., Nov. 2001 (33 pp.).

Okmianski, A., *Transmission of syslog message over UDP*, draft-ietf-syslog-transport-udp-06, syslog Working Group, Internet-Draft, Cicsco Systems, Inc., Nov. 8, 2005 (10 pp.).

Postel, J., *User Datagram Protocol*, RFC 768, ISI, Aug. 28, 1980 (3 pp.).

* cited by examiner

MECHANISM FOR PROCESSING NETWORK EVENT PROTOCOL MESSAGES

CROSS-REFERENCE TO RELATED APPLICATIONS

This application is a continuation of U.S. patent application Ser. No. 14/304,745, filed on Jun. 13, 2014, which is a continuation of U.S. application Ser. No. 11/616,949, filed on Dec. 28, 2006, The U.S. Application claims priority to Chinese Patent Application No. 200610057508.0, filed on Mar. 9, 2006. The afore-mentioned patent applications are hereby incorporated by reference in their entireties.

FIELD

The present invention relates to the field of communications, and particularly to a method for transferring network event protocol messages.

BACKGROUND

SYSLOG (network event protocol) is an event delivery protocol widely used in various network operation systems, such as Microsoft Windows, Unix and Linux, etc.

The SYSLOG protocol works in a Client-Server mode for communication, and the Client is the sender while the Server is the receiver of an event message. The Client may be an event generator such as equipment or a procedure, and it also may be a relay entity which processes the SYSLOG event received from another sender (an event generator or other relay entities) and then sends the processed event to another receiver.

The SYSLOG protocol is a simplex communication protocol, that is, the event message is only sent from the sender to the receiver, and the receiver does not send any acknowledgement, "connect start", "connect close" message or the like, i.e., the receiver never sends any message to the sender in the layer of SYSLOG protocol (however, bi-directional communication may be needed for the transport protocol in the lower layer).

The SYSLOG protocol is a text-based protocol in which all parameter names and parameter values are text, and uses of the characters with code value less than 32 in ASCII code are avoided, that is, uses of the control character are avoided. A SYSLOG message may be simply taken as a text block from the view of the lower layer transfer protocol.

At present, User Datagram Protocol (UDP) is generally used to transfer a SYSLOG message. As UDP is used to transfer a SYSLOG message, each UDP message can only transfer one SYSLOG message according to the relationship between the length of a SYSLOG message and that of a UDP message. The protocol stack for a UDP based SYSLOG message transfer is shown in part A of the schematic diagram of the SYSLOG protocol stack structure in FIG. 1.

However, UDP is an unreliable connectionless protocol in spite of its simplicity and flexibility. Losses may occur during message transfer based on UDP, and such matters as "packet loss" are not handled by the SYSLOG message, thus the loss of the event information may occur while the UDP is used to transfer a SYSLOG message. As a reliable connection-oriented protocol, a transfer control protocol (TCP) may be used to transfer the SYSLOG message so as to improve the reliability of data transfer. A protocol stack for a TCP-based SYSLOG message transfer is shown in part B of the schematic diagram of the SYSLOG protocol stack structure in FIG. 1.

At present, the Internet security is increasingly critical for stably running the network; similarly, the SYSLOG protocol also faces security problems as following:

1. information falsification: the SYSLOG message may be falsified by a malicious intermediate network node during transfer.
2. information leakage: the SYSLOG message may be intercepted illegally during transfer, and information in the SYSLOG message, such as the description information of an event, is taken.
3. identity spoofing: a malicious node imitating as a legal node participates in the communication of SYSLOG.

In order to solve the security problems of the SYSLOG message transfer, the SYSLOG message may be transferred over such secure protocols as Transport Layer Security protocol (TLS), BEEP (a TCP based secure protocol) and Secure SHell protocol (SSH), all of which can provide such safety mechanisms as privacy, integrity and data source verification so that the security problems of the SYSLOG message can be solved. A protocol stack for transferring the SYSLOG message based on TCP or secure protocols is shown in part C of the schematic diagram of SYSLOG protocol stack structure in FIG. 1.

When TCP or a secure protocol is used to transfer the SYSLOG message, the message that can be transferred may be long while a SYSLOG message is generally short. Therefore, a plurality of SYSLOG messages may be arranged in one TCP or secure protocol message so as to improve the transfer efficiency. When a receiver receives a transferred message, there may be a plurality of SYSLOG messages in the payload of the message (for secure protocol transfer, the payload has to undertake a secure protocol operation such as decipherment first). Therefore, the received message can only be properly processed by identifying the border of each SYSLOG message therein and parsing each SYSLOG message from the payload.

A method in a related art for parsing the SYSLOG messages from the payload is to add one or more special control characters to the end of each SYSLOG message. Since the SYSLOG protocol is a plain text protocol, and characters with ASCII code less than 32 are avoided in the contents of the message, the added special control character is usually a character whose code is less than 32 in ASCII, such as Carriage Return and Line Feed (CR and LF, whose codes are 13 and 10 in ACSII, respectively). When the receiver receives and processes the aforesaid SYSLOG message, once an aforesaid special character is found in the message, the SYSLOG message is considered to reach its end, and the beginning of another SYSLOG message is followed or the entire payload is ended (for the last record in the payload, the aforesaid special control character may not be added thereafter). Refer to FIG. 2 for the schematic diagram of adding one or more special control characters to the end of each SYSLOG message.

The aforesaid method has such drawbacks as large processing consumption and low processing speed, for the processing program should traverse all characters in the payload to detect the aforesaid special control character, so as to determine the beginning and end of each SYSLOG message.

Furthermore, errors in the parsing of the SYSLOG message may also occur according to the aforesaid method. For example, in a SYSLOG safety mechanism, a hash is created for each SYSLOG message by such a hash function as MD5 or SHA1, and all the hashes are put in the SYSLOG message. The SYSLOG message may also include other information. Then, signature is made for the SYSLOG message and put into the SYSLOG message, and then transferred to the receiver (a relay entity or a collection entity), and the receiver validates the identity of the SYSLOG sender according to the signature. In addition, the certificate for validating signature is also sent to the receiver via one or more SYSLOG messages.

The aforesaid hash, signature and part of the contents in a certificate sent to the receiver are all in the binary format, in which an aforesaid special control character may be included. In this situation, during the parsing of the SYSLOG message by the aforesaid method, special control characters in the hash, signature or certificate may be mistaken as the border of the SYSLOG message, thus errors in the parsing of the SYSLOG message may occur.

There is another possible method in another related art for parsing the SYSLOG message from the payload. In order to solve the aforesaid problem of mis-parsing the message due to the existence of the signature, the message may be analyzed orderly, that is, the message is analyzed from the beginning of the payload, and whenever a hash, signature or certificate is found, the end of them is determined according to such characteristics as length of hash, signature or certificate. For each cryptographic algorithm/hash algorithm has its specific characteristic length, which makes it possible to find the end of each binary data by length.

DETAILED DESCRIPTION OF THE PREFERRED EMBODIMENTS

The embodiment of this invention provides a method for transferring a network event protocol message. In the embodiment, message length information is attached before each SYSLOG message, and a plurality of SYSLOG messages with message length information attached form a transport payload.

Figure 1:
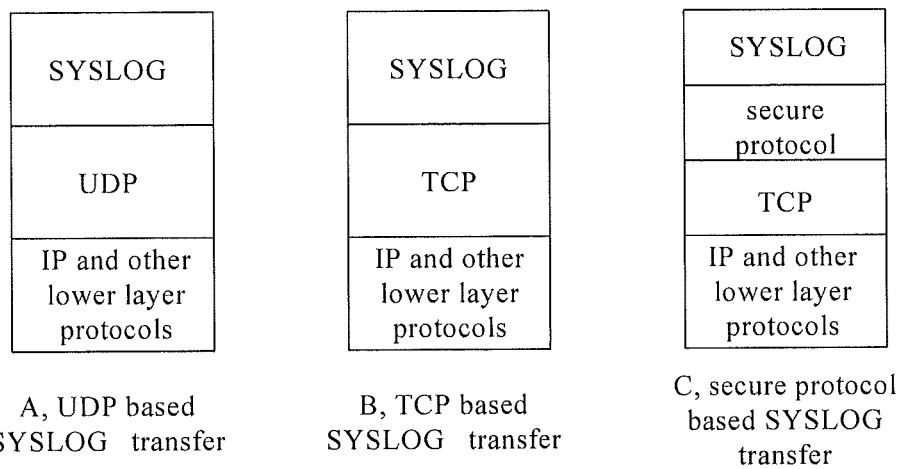
FIG. 1 is a schematic diagram illustrating the SYSLOG protocol stack structure.
Figure 2:
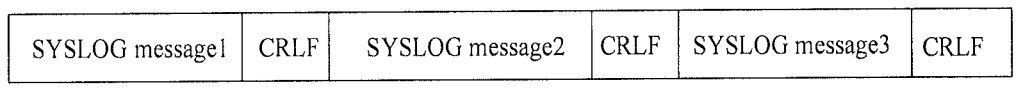
FIG. 2 is a schematic diagram illustrating the process of adding one or more special control characters to the end of each SYSLOG message.
Figure 3:
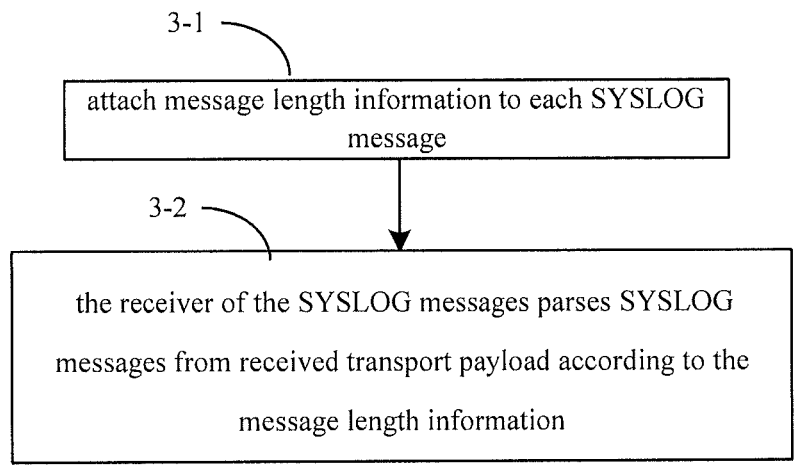
FIG. 3 is a flowchart illustrating the processing procedure of the method according to an embodiment of this invention.

This invention is hereinafter described in detail with reference to the accompanying drawings as well as the embodiment. As shown in FIG. 3, the processing procedure of the method in accordance with an embodiment of this invention includes the following steps.

Step 3-1: attaching message length information to each SYSLOG message.

Message length information needs to be attached to each SYSLOG message to be sent, and a plurality of SYSLOG messages with message length information attached form a transport payload. The message length information may be located before each SYSLOG message.

The message length information indicates the number of the total bytes of the SYSLOG message; the message length information may include or may not include the length of the message length information. The message length information may be denoted by 4 bytes (8 bits in each byte) so that the maximum SYSLOG message length that can be denoted is $2^{32}$ (4,294,967,296) bytes. The beginning and the end of each SYSLOG message in the transport payload may be rapidly found out according to the message length information.

Step 3-2: the receiver of the SYSLOG message parses the SYSLOG messages from the transport payload including the SYSLOG messages, according to the message length information attached.

After the message length information is attached to the SYSLOG message, the sender of the SYSLOG message sends the SYSLOG message to the receiver of the SYSLOG message. A plurality of SYSLOG messages received by the receiver of the SYSLOG message form a transport payload. According to the message length information attached, the receiver of the SYSLOG message may rapidly determine the beginning and the end of each SYSLOG message in the transport payload one by one, and thereby parses each SYSLOG message one by one.

Figure 4:
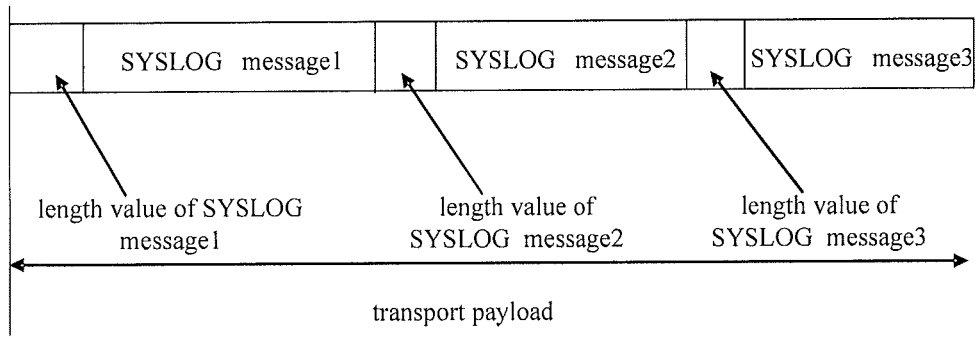
FIG. 4 is a schematic diagram illustrating the transport payload received by the receiver of the SYSLOG message according to the embodiment of this invention.

In an embodiment of this invention, transport payload received by the receiver of the SYSLOG message is shown in FIG. 4. The process for parsing each SYSLOG message one by one from the transport payload is as follows:

1. the receiver of the SYSLOG message reads the first 4 bytes of the transport payload, and obtains the length value n1 of SYSLOG message 1 (suppose that the length value n1 does not include the length of the length value).

2. the receiver of the SYSLOG message reads n1 bytes from the fifth byte of the transport payload on, takes the read bytes as the first SYSLOG message, and gives the first SYSLOG message to a SYSLOG message processing module to process.

3. the receiver of the SYSLOG message reads 4 bytes from Byte n1+4 on, and obtains the length value n2 of SYSLOG message 2.

4. the receiver of the SYSLOG message reads n2 bytes from Byte n1+4*2+1 of the transport payload on, takes the read bytes as the second SYSLOG message, and gives the second SYSLOG message to the SYSLOG message processing module to process.

5. the receiver of the SYSLOG message repeats the aforesaid process, reads all the SYSLOG messages in the transport payload until reaches the end of the entire transport payload.

In the above processing procedure of the method according to the embodiment of this invention, the message length information and additional information related to the SYSLOG message may be attached simultaneously to the SYSLOG message. For example, along with the message length information, the type information of the SYSLOG message and/or padding length information may be attached, and the type information of the SYSLOG message can be used in cooperation with an appropriate local strategy to speed up the process for processing the SYSLOG message. Appropriate bytes may be padded in the end of the SYSLOG message to make an attacker difficult to launch a traffic analysis attack; and the padding length information attached allows the communication equipment to conveniently make an effective parse identification of the SYSLOG message.

The foregoing is only the preferred embodiment of the present invention and is not intended to limit the scope of the present invention. Any modification, equivalent substitution, or improvement made without departing from the spirit and principle of the present invention should be covered by the scope set forth in the appended claims.

What is claimed is:

1. A communication system, comprising:
   an apparatus configured as a SYSLOG client, which is configured to:
   attach first message length information to a first SYSLOG message;

attach second message length information to a second SYSLOG message;

form at least a portion of a transport payload by adding a first portion and a second portion thereto, wherein the first portion includes the first SYSLOG message with the attached first message length information, and the second portion includes the second SYSLOG message with the attached second message length information; and send the transport payload;

and an apparatus configured as a SYSLOG server, which configured to:

receive the transport payload sent by the apparatus configured as a SYSLOG client; and parse the first and second SYSLOG messages one by one from the transport payload by reading the first message length information from the transport payload and processing the first SYSLOG message according to the first message length information, and thereafter reading the second message length information from the transport payload and processing the second SYSLOG message according to the second message length information.

2. The communication system of claim 1, wherein the first and second message length information indicate the number of bytes of the respective first and second SYSLOG message.

3. The communication system of claim 2, wherein the number of bytes of the first and second SYSLOG messages are the number of bytes of the respective first and second SYSLOG messages with or without the respective message length information.

4. The communication system of claim 1, wherein the apparatus configured as a SYSLOG client is configured to:

attach the first message length information in front of the first SYSLOG message; and attach the second message length information in front of the second SYSLOG message.

5. The communication system of claim 1, wherein each of the first and second message length information includes 4 bytes.

6. The communication system of claim 1, wherein the apparatus configured as a SYSLOG client is configured to:

attach additional information related to the respective first and second SYSLOG messages along with their respective first and second message length information to the respective first and second SYSLOG messages.

7. The communication system of claim 6, wherein the additional information comprises a type of SYSLOG message, padding length information, or both, for the respective first and second SYSLOG messages, and wherein the apparatus configured as a SYSLOG server is configured to:

process the first and second SYSLOG messages in accordance with a local strategy according to the respective type information; and identify the first and second SYSLOG messages according to the respective padding length information.

* * * * *